H. L. DE ZENG.
LENS MEASURING DEVICE.
APPLICATION FILED NOV. 19, 1912.
1,218,243.
Patented Mar. 6, 1917.
2 SHEETS—SHEET 1.
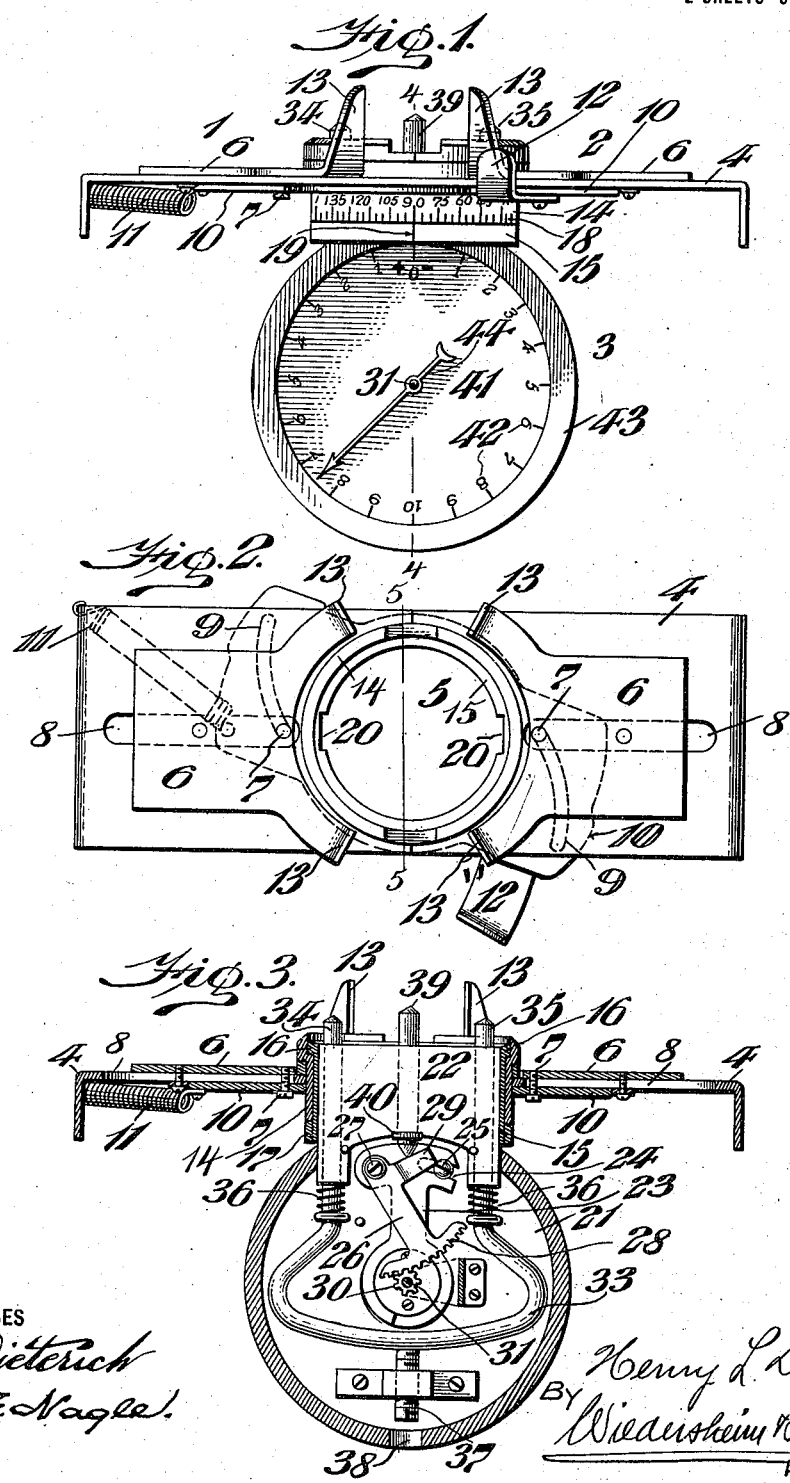
WITNESSES
INVENTOR
Henry L. De Zeng.
BY
ATTORNEYS

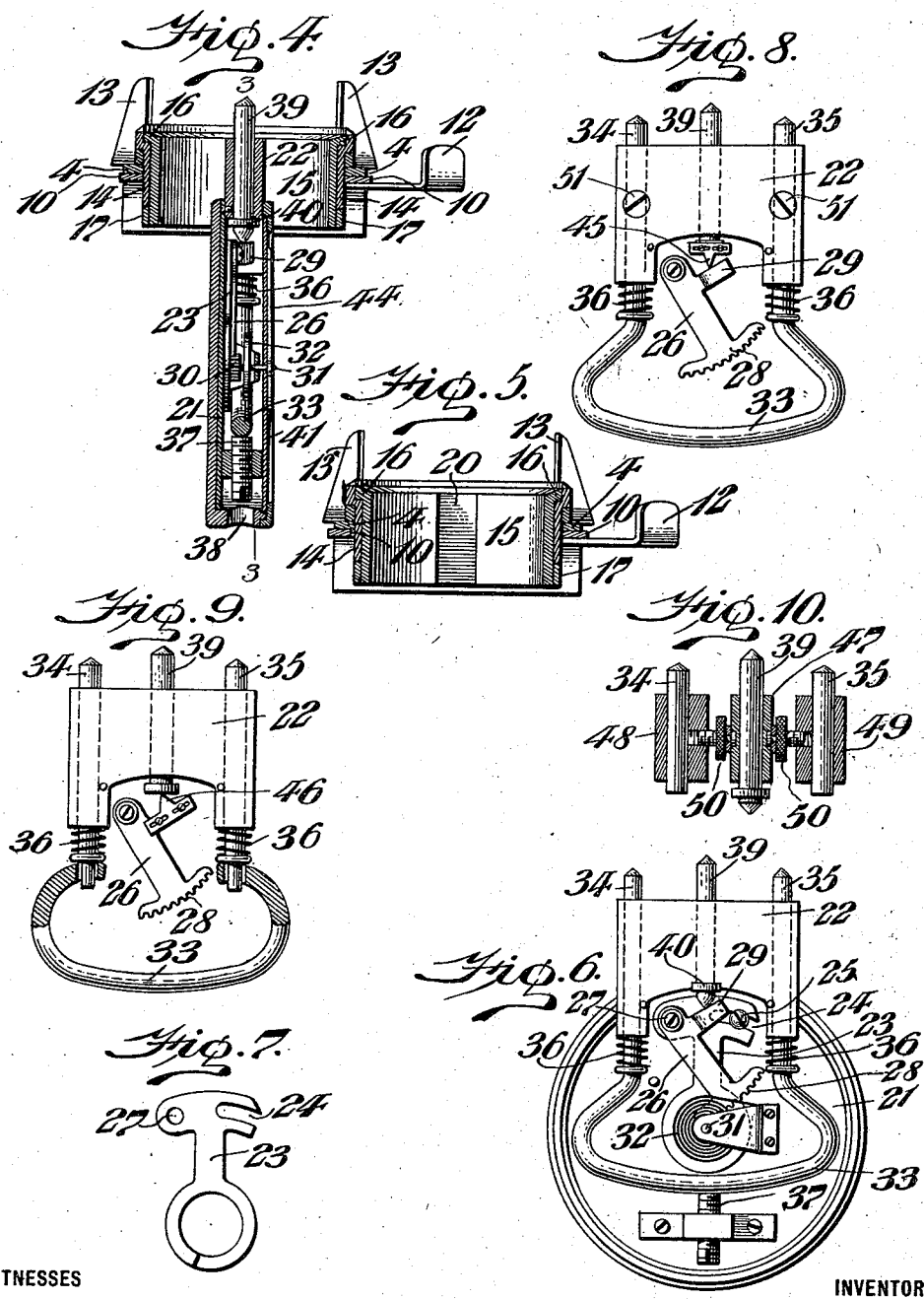

UNITED STATES PATENT OFFICE.

HENRY L. DE ZENG, OF MAPLE SHADE, NEW JERSEY.

LENS-MEASURING DEVICE.

1,218,243.   Specification of Letters Patent.   Patented Mar. 6, 1917.

Application filed November 19, 1912. Serial No. 732,198.

*To all whom it may concern:*

Be it known that I, HENRY L. DE ZENG, a citizen of the United States, residing at Maple Shade, county of Burlington, State of New Jersey, have invented a new and useful Lens-Measuring Device, of which the following is a specification.

My invention relates to a new and useful lens measuring device, and consists in providing means for measuring the angle of the cylindrical axis of a lens.

It further consists of means by which the focal length of cylindrical and spherical lenses may be measured, and also the angle of the cylindrical axis of the same.

It further consists in providing a support and a lens measurer, whereby the focal length of cylindrical and spherical lenses, as well as the angle of the cylindrical axis of the lenses, may be measured.

It further consists of a plurality of contact points, which are adapted to be moved over the face of a lens, with indicating mechanism by which the relative position of the points is shown, with indicating mechanism, by which the angle of the cylindrical axis of the lens is shown, and means for supporting the lens.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

Figure 1 represents in elevation a lens measuring device embodying my invention.

Fig. 2 represents a plan of a lens support employed.

Fig. 3 represents a vertical sectional view on line 3—3 Fig. 4, showing the lens measurer in position.

Fig. 4 represents a sectional view on line 4—4 Fig. 1.

Fig. 5 represents a sectional view on line 5—5, Fig. 2.

Fig. 6 represents a side elevation of the lens measurer, with the closing disk removed.

Fig. 7 represents an elevation of an adjustable radial support employed.

Figs. 8 and 9 represent elevations of modifications of a portion of the mechanism employed, in detached position.

Fig. 10 represents a sectional view of a construction, showing means for laterally adjusting the contact points and the supporting sleeves therefor.

Similar numerals of reference indicate corresponding parts in the figures.

Referring to the drawings:—

1 designates a lens measuring device embodying my invention, the same consisting of a lens holder or support 2, and a lens measurer proper 3, the parts being adapted to be removably and operatively connected, as desired, in order to accomplish the result. The lens holder or support consists of a frame 4, which is provided with a suitable opening 5, at which the lens to be tested is held. In the present instance, I have shown upon one side of the frame 4, two movable plates 6, which are located upon opposite sides of the opening 5 in said frame, and which plates are movably held in position and guided in their movement by suitable means. In the present instance, I have shown screws or pins 7, which pass through and are movable in slots 8, formed in the said frame 4, said screws or pins extending through to the opposite side of the frame 4, from that upon which plates 6 are located, and said screws or pins 7 are movable in cam slots 9 formed in a rotatable lever or member 10, which latter is rotatably mounted on the frame 4, and has one end of a spring 11 connected therewith, said spring being also connected with the frame 4, in order that said spring 11 will normally hold the lever 10 in proper position, and return the same thereto, and will cause a suitable portion of the plates 6 to engage with the lens, when in position. The lever 10 is provided with a finger-piece 12, for operating the same, and the plates 6 are here shown as provided with or carrying engaging ears 13, which project suitably for grasping or engaging the edge of the lens, to be tested, to hold the same in proper position with respect to the opening 5 in the frame 4. These engaging ears may be of any suitable or desirable form required, as I do not desire to be limited to the type here shown. Carried by the frame 4 is a sleeve 14, which is secured in the opening 5 of the frame, and which projects preferably a suitable distance upon each side of the frame. Rotatably mounted in the sleeve 14 is a collar 15, which, as here shown, is provided with a flange or lug 16, engaging with the sleeve 14, and the opposite end of said collar having a flange 17, which also engages with the sleeve 14, in order that said collar is rotatably connected with said sleeve.

In order to measure the relative rotation of the sleeve and collar, I have provided a series of graduations or a scale on one of these members, and an indicator on the other, and, as shown in Fig. 1 of the drawings, I have provided a scale 18 upon the sleeve 14 and have placed the indicator 19 upon the collar. As here shown, the collar is provided with grooves 20 upon its inner face, the same serving as the means for removably and operatively connecting the lens holder or support 2 with respect to the lens measurer 3. Any suitable form of lens measurer may be employed, which properly coacts with the lens support, and for the purpose of illustrating my invention, I have shown in the drawings one form thereof which is at present preferred by me, since the same has been found in practice to give satisfactory and reliable results, although it is to be understood that the various parts may be variously arranged and organized and that my invention is not limited to the precise arrangement and organization, as herein shown and described.

The lens measurer consists of a casing 21 carrying a block 22, the same being connected with or carried by the said casing in any suitable or desired manner. Adjustably supported within the casing is an arm or member 23, which may be of any suitable form, and which, as here shown, is provided with a slot 24, in which is seated a set screw 25 for locking the arm with respect to the casing 21, it being understood that the end of said arm can be moved in an arc of a circle with respect to its center of rotation, and locked in its adjusted positions by means of the said set screw 25.

Pivotally mounted at a suitable point on the arm 23, with respect to its center of rotation of the casing 21, is a lever 26, which, as here shown, is pivoted at 27 to said arm, said lever having a rack or segment 28 upon one end and having an offset 29 adjacent the opposite end. The rack 28 is adapted to mesh with a pinion 30 carried by a spindle or shaft 31, suitably mounted in the casing 21, and to which spindle is connected a spring 32, which is also connected with a suitable stationary point, in order to hold the spindle in normal position and to return the same thereto.

34 and 35 designate contact points, which are here shown as mounted in the block 22, said points 34 and 35 being adjustably and normally fixed in relation to the recording mechanism through the medium of the block.

36 designates springs in suitable relation to said contact points in order to hold the same normally in fixed relation to said block and permitting adjustment therebetween.

33 designates a rod or member for supporting the said contact points, and for adjusting them simultaneously. Said rod 33 may be integral with said points, as shown in Fig. 3, or separate therefrom and bearing thereupon, as shown in Fig. 9.

As here shown, I have mounted a set screw 37 at a suitable point, in order to bear against the rod 33, so that by movement of the said set screw 37, the said rod and so the contact points 34 and 35 may be adjusted and held in fixed relation to the indicating mechanism, it being understood that the said screw effects a simultaneous adjustment of said contact points. A suitable opening 38 is provided in the casing 21 for access to the said screw 37. Movably mounted in the block 22 is the movable contact point 39, which is provided with means, such as a shoulder or head 40, to prevent improper escape from the block 22, and the end of said contact point 39 is here shown as bearing upon the offset arm 29 of the lever 26, so that movement of the said contact point 39 inwardly, will actuate the lever 26 to throw the rack 28, in order to rotate the spindle 31 against the tension of the spring 32, the latter returning the spindle, when the pressure upon the movable contact point 39 is removed. The casing is closed by a disk or plate 41, provided with suitable notations or a scale 42, and said disk 41, is here shown as held in place by an annular cap 43.

Mounted upon the spindle 31, exterior of the disk 41, is a pointer 44.

Attention is directed to the fact that by pivotally supporting the segment lever 26 upon the radially adjustable arm or member 23, the fulcrum may be varied, that is to say, that by increasing or decreasing the distance between the pivotal point of said lever, and the point of contact of the said compressible contact point, with the said lever, the throw of the indicating mechanism may be increased or decreased, as required. This result may be accomplished in various ways, several of which are shown in the drawings. For example, in Fig. 8, I have shown a laterally adjustable member 45, mounted on the movable contact 39, said member bearing upon the off-set arm 29 of the segment lever 26, so that the same effect is obtained.

In Fig. 9, I have shown a contact member 46, adjustably mounted on the segment lever 26, the movable contact point 39 bearing upon the said contact member 46, so that the same effect, as previously described, is obtained. I have also shown in this figure, the rod 33 as separate from the contact points 34 and 35 and bearing against the same, which will operate in the same manner as if the said rod 33 were integral with the said contact points 34 and 35, in order to accomplish the desired adjustment of the same, and for holding the said contact points in fixed relation to the indicating mechanism, as previously stated.

The throw of the indicating mechanism can also be increased or decreased by the lateral adjustment of the fixed contact points with relation to the movable contact point, and as an example for accomplishing this result, I have shown in Fig. 10, the movable contact point 39 passing through a sleeve or support 47, with the normally fixed contact points 34 and 35 mounted in sleeves or supports 48 and 49, which are adapted to be laterally adjusted with respect to the said support 47, and, in the present instance, by means of the set screws 50. Should it be desirable, I may provide additional means for holding the contact points 34 and 35 immovable with respect to the block 22, and in Fig. 8, I have shown set screws 51 as an example of such additional means. The operation of the device will be readily apparent.

The contact points of the lens measurer are adapted to be brought into contact with the surface of the lens to be measured, whereupon the central or movable contact point projecting normally beyond the others, will be depressed with respect to the other two contact points, and with respect to the curve of the surface of the lens with which it is in contact. This movement or change of position of the movable contact point 39 with respect to the fixed points 34 and 35 will actuate the segment lever 26, causing the segment 28 thereof to actuate the spindle 31 carrying with it the pointer 44, in order that the same will be moved to a point upon the scale of the disk 41 to indicate the radius of curvature or focal length of the lens, by which means the said radius of curvature or focal length is accurately measured and determined.

When it is desired to determine the angle of the cylindrical axis of the lens, I have provided the support 2, in which the lens is placed and held by the engaging ears 13, by a proper actuation of the mechanism described, so that the said lens will be firmly supported therein and held in position with respect to the opening 5 in said support. The lens measurer is then brought into suitable connection or engagement with the support, by inserting the block 22 into the slots 20 of the collar 15 of the support 2. The lens measurer can then be rotated with respect to the support, with the contact points contacting with the surface of the lens so supported. The movable contact point 39 will accommodate itself to the variations in the lens surface with respect to the fixed contact points 34 and 35, which will cause a movement of the indicating mechanism and of the indicator pointer 44, so that the amount of variation between the different meridians of the lens surface will be indicated and measured. At the same time, the relative angular position of the said lens measurer with respect to the said lens support, is indicated and measured by means of the scale 18 and indicator 19, so that the angle of the cylindrical axis of a lens may be measured through the contact of the said contact points with the surface thereof. In like fashion, the angle of any given meridian of a lens may be determined, as in toric lenses, etc.

It will be understood that when the three contact points are in direct alinement with the axis of a plain cylindrical lens, the said contact points will be in exact relative horizontal alinement. When the said contact points are in a position at right angles with the cylindrical axis of a plain cylindrical lens, the maximum radius of curvature of the cylindrical lens will then be indicated upon the dial. It is therefore obvious that a rotation of the contact points upon the surface of a cylindrical lens, will indicate the exact meridian of its cylindrical axis, zero being indicated upon the dial when the three contact points are in exact alinement with the cylindrical axis of the lens, in which meridian of a plain cylindrical lens there is no focal power.

While I have shown and described the scale and indicator for measuring the angle of the axis of a cylindrical lens when mounted upon or carried by the support 2, it will of course be apparent that these parts may be variously arranged and supported in any suitable manner, in order that they will indicate and measure the relative angular position of the contacting parts of a lens measurer with respect to a lens carried by the support when the measurer and support are conjunctively engaged.

Having thus described my invention, what I claim as new and desire to secure by Letters Patent, is:—

1. In a lens measurer, members adapted to contact with the surface of a lens, indicating mechanism connected therewith, a lens support having means for engagement with said contacting members, means on said support for gripping a lens, said gripping means operating simultaneously with respect to a common center, and means for determining the relative angular position of a lens with respect to said contacting members.

2. In a lens measurer, members adapted to contact with the surface of a lens, indicating mechanism adapted to be actuated by said contacting members, a lens support having means for removable engagement with said contacting members and said indicating mechanism, means on said lens support for gripping a lens, said gripping means operating simultaneously with respect to a common center, and means for determining the relative angular position of said contacting members with respect to any meridian of said lens.

3. In a lens measurer, members adapted to contact with the surface of a lens, indicating mechanism connected therewith, a lens support rotatably mounted with respect to said contacting members, means on said lens support for gripping a lens, said gripping means operating simultaneously with respect to a common center, and means for determining the relative angular position of any required meridian of said lens with respect to the major axis of an elliptically shaped lens.

4. In a lens measurer, members adapted to contact with the surface of a lens, indicating mechanism connected therewith, a lens support detachably connected with said contacting members, means on said support for gripping a lens, said gripping means operating simultaneously with respect to a common center, and means for determining the relative angular position of the cylindrical axis of the lens with respect to the 180° meridian thereof.

5. In a lens measurer, two normally fixed contact points, a movable contact point in suitable relation therewith, an adjustably fixed segment arm upon which said movable contact point directly bears, indicating mechanism adapted to be suitably actuated by said segment arm, whereby the relative position of said movable contact point with respect to the said normally fixed contact points may be determined, and means for simultaneously adjusting said normally fixed contact points in a direction in the lines of their axes.

6. A lens holder or support, which comprises in combination, means for holding a lens, a support for said holding means, indicating mechanism for supporting the holding means, mechanical interfitting means for effecting actual connection between said holding means and said indicating mechanism, and means for determining the angle of any required meridian of a lens with respect to the meridian of zero thereof.

HENRY L. DE ZENG.

Witnesses:
C. D. McVay,
N. Bussinger.

Copies of this patent may be obtained for five cents each, by addressing the "Commissioner of Patents, Washington, D. C."